United States Patent [19]

MacMillan

[11] 3,778,203

[45] Dec. 11, 1973

[54] MATRIX ASSEMBLY WITH SEGMENTED MATRICES

[76] Inventor: Kenneth T. MacMillan, 4992 Wesleyan Woods Dr., Macon, Ga. 31202

[22] Filed: Apr. 11, 1972

[21] Appl. No.: 243,366

Related U.S. Application Data

[63] Continuation-in-part of Ser. No. 90,687, Nov. 18, 1970, abandoned.

[52] U.S. Cl.............. 425/20, 425/25, 425/47, 425/DIG. 5, 249/205, 308/4 R, 92/171
[51] Int. Cl............................................. B29h 5/04
[58] Field of Search .............. 425/23, 25, 28, 29, 425/38, 40, 47, DIG. 5; 249/68, 205; 308/4 R; 92/171

[56] References Cited
UNITED STATES PATENTS

| | | | |
|---|---|---|---|
| 2,174,189 | 9/1939 | Heintg | 425/23 |
| 2,948,031 | 8/1960 | Webb | 425/DIG. 5 |
| 3,337,918 | 8/1967 | Pacciarini et al. | 425/29 |
| 3,479,693 | 11/1969 | Cantarutti | 425/40 |
| 3,520,024 | 7/1970 | Caretta et al. | 425/38 |
| 3,724,981 | 4/1973 | Schiemann | 425/DIG. 5 |
| 2,272,718 | 2/1942 | MacLagan et al. | 249/68 UX |
| 3,044,120 | 7/1962 | Wiskoff et al. | 249/68 |
| 2,969,569 | 1/1961 | Brown | 249/68 |

FOREIGN PATENTS OR APPLICATIONS

1,160,606  1/1964  Germany

*Primary Examiner*—J. Howard Flint, Jr.
*Attorney*—Charles E. Brown et al.

[57] ABSTRACT

This disclosure relates to a matrix assembly for treading tires and includes a pair of matrix shell halves each of which has mounted therein segments which combine to define one half of a matrix. The matrix segments are resiliently urged out of the matrix shell in guided relation so that when the matrix assembly is open for the reception or discharge of a tire, the matrix segments are expanded so as to facilitate the loading and unloading of the matrix. A principal feature is the provision of wear retarding means whereby the matrix segments, which are normally formed of a relatively soft metal, such as aluminum, are not unduly worn as they shift relative to the shell halves.

6 Claims, 3 Drawing Figures

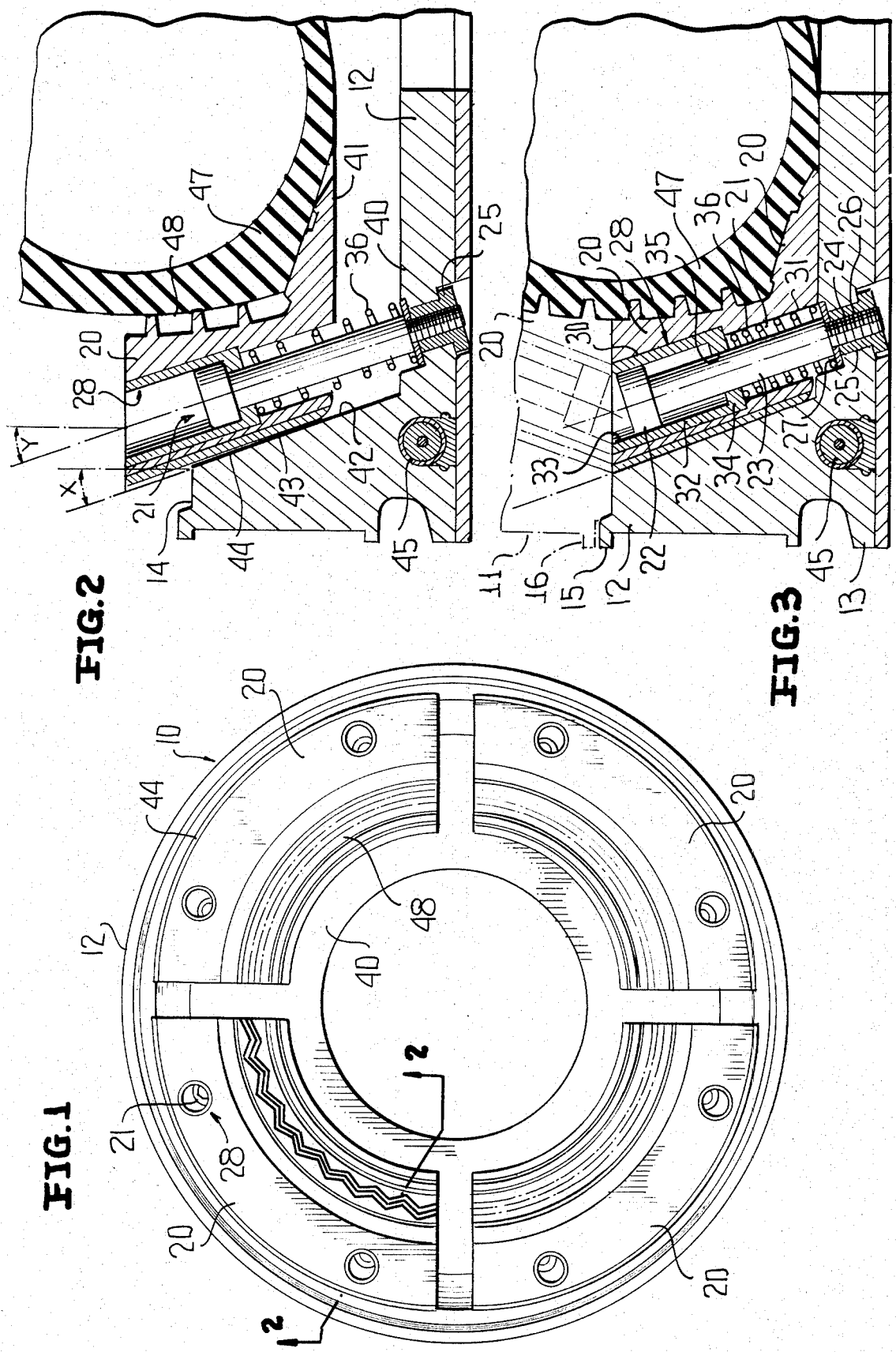

MATRIX ASSEMBLY WITH SEGMENTED MATRICES

This application is a continuation-in-part of my co-pending application Ser. No. 90,687, entitled MATRIX, filed Nov. 18, 1970, now abandoned.

This invention relates in general to new and useful improvements in matrix assemblies for treading tires.

BACKGROUND OF THE INVENTION

It is well known to form a tire treading matrix in segments and to associate the segments with a holder whereby once a tire is placed within the matrix segments, the holder may be moved to a matrix clamping position with the matrix closing circumferentially and radially inwardly about the tire preparatory to the curing of the tire tread. Such a matrix construction is found in the patent to Donald MacMillan U.S. Pat. No. 3,520,025, granted July 14, 1970. It is also known from German patent specification No. 1,160,606 dated Jan. 2, 1964, for the mold segments to be mounted on guide pins carried by the matrix shell halves with the guide pins being disposed at an angle to the general axis of the matrix assembly, and for the matrix segments to be spring loaded to move axially relative to the shell halves whereby when the matrix assembly is opened, the matrix segments automatically move axially and circumferentially to open positions for the reception or release of a tire.

It will be readily apparent that in order for the matrix segments to cooperate with one another to form the desired matrix halves, it is necessary that the matrix segments be accurately positioned by the shell halves in the closed position of the matrix assembly. However, it has been found that the relative sliding movement of the matrix segments with respect to the shell halves has resulted in the wearing of components, particularly when the matrix segments are formed of a relatively soft metal, such as aluminum, and therefore, while the matrix assemblies have performed satisfactorily when new, after they have been used for a limited period of time, they have worn to the extent that they do not perform satisfactorily.

SUMMARY OF THE INVENTION

In accordance with this invention, it is proposed to provide a matrixx assembly of the foregoing type but wherein wear retarding means are provided for retarding wearing of the matrix segments during the movement of the matrix segments between open and closed positions.

It is to be understood that in the open position of the matrix segments, the matrix segments are circumferentially spaced. Thus, as the matrix segments move to a closed position, the matrix segments not only move axially, but also circumferentially. In the closed position of the matrix segments, the matrix segments are seated on a generally circumferential, but sloping surface of the shell halves with the cooperation being a wedging cooperation and the matrix segments being tightly wedged together by such cooperation.

In the past, there has been sliding contact between the outer periphery of the matrix segments and the inner periphery of the shell halves. However, an attempt has been made to control this sliding engagement by mounting the matrix segments on guide pins. The guide pins, however, merely define the path of movement of the matrix segments and do not prevent the sliding frictional engagement between the matrix segments and the shell halves.

In accordance with this invention, it is proposed to mount the guide pins at a lesser angle to the axis of the matrix assembly than the mating peripheral surfaces whereby as the matrix segments move from their seated or closed positions, they are moved circumferentially inwardly out of contact with the shell halves, thus eliminating this undesirable frictional engagement.

Another feature of the invention is to provide the outer peripheral surface of the matrix segments with a hardened surface which is resistant to wear so that any sliding contact thereof with the shell halves will not unduly result in the wearing of the matrix segments.

Another feature of the invention is the proper mounting of the matrix segments on the guide pins for guided sliding movement. This is accomplished by providing the matrix segments with hardened inserts which are constructed to cooperate with the guide pins so as to assure the proper guiding of the matrix segments. At the same time, because the inserts are hardened, there is no appreciable wear which would limit the guiding ability of the guide pins.

With the above and other objects in view that will hereinafter appear, the nature of the invention will be more clearly understood by reference to the following detailed description, the appended claims and the several views illustrated in the accompanying drawings:

IN THE DRAWINGS

FIG. 1 is a plan view of one half of the matrix assembly showing the half in its open condition.

FIG. 2 is an enlarged fragmentary vertical sectional view taken generally along the line 2-2 of FIG. 1 and schematically illustrates a tire to be tread positioned within the matrix half.

FIG. 3 is a sectional view similar to FIG. 2 but shows the matrix assembly in its closed position with the matrix segments being seated in the shell half, there also being shown a portion of the upper half of the matrix assembly in phantom lines.

Referring now to the drawings in detail, it will be seen that there is illustrated the matrix assembly which is the subject of this invention, the matrix assembly being generally identified by the numeral 10. The matrix assembly 10 includes an upper matrix shell half 11 (FIG. 3) and a lower matrix shell half 12. The remote ends of the shell halves 11,12 are provided with flanges 13 to facilitate the gripping thereof within a matrix loader (not shown). Thus, when the matrix assembly 10 is placed within a matrix loader, the matrix shell halves 11,12 may be readily gripped and the matrix assembly 10 divided into two halves through the opening thereof by means of the matrix loader.

The matrix shell halves 11,12 have mating faces 14 in contacting relation when the matrix assembly 10 is closed, one of the matrix shell halves being provided with a projection 15 adjacent the mating face 14 thereof and the other of the matrix shell halves being provided with a like annular projection 16. With particular reference to FIG. 3, it will be seen that when the matrix shell halves 11,12 are brought together with their mating surfaces 14 in contacting relation, the matrix assembly 10 may be clamped in a closed position by means of a peripheral clamping ring (not shown) which may engage the projections 15,16. The clamping ring may be of any conventional construction and the description thereof here is believed to be unnecessary.

Referring now to FIG. 1 in particular, it will be seen that the matrix shell half 12 is provided with a plurality of matrix segments 20. In the illustrated form of the matrix assembly, each matrix shell half is provided with four matrix segments 20. However, the number of matrix segments may vary although normally three is considered to be a minimum number and four to be a practical number of matrix segments for each matrix shell half.

Each of the matrix segments 20 is carried by a pair of guide pins 21 which are of a special construction. Each guide pin 21 includes an enlarged head 22 which is preferably circular in cross section, a stem portion 23 and a reduced cross sectional threaded end portion 24. Because the matrix shell halves 11,12 are normally formed of a relatively soft metal having good heat conducting characteristics, such as aluminum, the matrix shell halves are preferably provided with inserts 25 which are replaceable and which have threaded bores 26 receiving the threaded ends 24 of the guide pins 21. Furthermore, an oversized washer 27 is clamped between the stem portion 23 and the insert 25.

Inasmuch as the guide pins 21 are fixed and the matrix segments 20 are mounted for movement relative to the guide pins 21, and since the matrix segments 20 are preferably formed of a relatively soft heat conducting metal, such as aluminum, wear between the contacting guide parts will most likely occur. In order to prevent this, each matrix segment 20 is provided with a guide insert 28 for each of the guide pins 21. Each insert 28 is replaceably seated in a socket 30 which is an enlargement of a lower socket 31 in which the stem portion 23 is freely positioned. The insert 28 includes a tubular body 32 defining an internal guide surface 33 which cooperates with a head 22 of the guide pin 21. The insert 28 also includes a base or bottom wall 34 having an aperture 35 therethrough snugly engaging the stem portion 23 and forming a guide surface therefor.

From the foregoing, it will be readily apparent that the relationship between the guide pins 21 and the inserts 28 is such that each matrix segment 20 is guided for movement along a predetermined path and at the same time, the contacting components are of a construction which resists wearing thereof so that the accuracy of movement of the matrix sections 20 is maintained over a period of time.

In order that the matrix segments 20 may automatically be moved to open positions, each guide pin 21 has associated therewith a compression spring 36 which is telescoped over the lower portion of the respective guide pin 21 and which has the opposite ends thereof contacting the washer 27 and the underside of the base 34. Inasmuch as the compression spring 36 engages only relatively hard materials, no undue wearing action results.

With particular reference to FIG. 2, it will be seen that the matrix shell half 12 is provided with a seating surface 40 which lies generally in a plane disposed transversely of the axis of the matrix assembly. In a like manner, each matrix segment 20 is provided with a seating surface 41 which opposes the seating surface 40 and is cooperatively engageable therewith to position the mold segments 20, as is shown in FIG. 3.

The shell halves 11,12 are also provided with a generally circumferential seating surface 42 which slopes towards the axis of the matrix assembly. The outer peripheral of each mold segment 20 includes a seating surface 43 which corresponds generally thereto and is cooperable therewith in the manner shown in FIG. 3 to serve in urging the matrix segments 20 radially inwardly. It will be readily apparent that as the mold segments 20 move between open and closed positions, there is rubbing contact between the surfaces 42,43. To prevent undue wearing of the relatively soft metal, the mold segments 20 are provided with wear resisting jackets 44 which are preferably formed of a special aluminum alloy.

It is to be noted that the seating surface 42 is disposed at an angle X to the axis of the matrix assembly. It is also to be noted that taken in a plane normal to the plane containing the two guide pins 21 of a selected matrix segment 20, the angle between the axis of the guide pin 21 and the axis of the matrix assembly is identified as angle Y. Angle X is greater than angle Y, for example, angle X may be 20° while angle Y is 18°. Thus, when a matrix segment 20 moves away from its respective seat 40, it moves both axially and circumferentially. However, the extent of the circumferential movement of the matrix segment 20 is less than the angle of slope of the seating surface 42 with the result that the movement of the matrix segment 20 relative to the seating surface 42 is both axially and circumferentially inwardly. Thus, as the matrix segment 20 moves away from the seating surface 40, the seating surface 43 thereof moves away from the seating surface 42. In this manner, the rubbing engagement between seating surfaces is restricted to that which occurs during an initial opening movement and during a final closing movement.

It will be readily apparent that the various wear retarding means combine to define an assembly wherein repeated relative movement between the matrix segments and matrix shell halves may occur without undue wearing of the parts thereof. Inasmuch as the parts are subject to wear each time the matrix assembly is open and each time it is closed, it will be readily apparent that this wear could be very severe.

The matrix assembly will, of course, be provided with some suitable type of heating means. In FIGS. 2 and 3 the heating means has been illustrated as being a conventional electrical heating element 45 which is embedded in the matrix shell halves.

In the operation of the matrix assembly 10, when the matrix shell halves 11,12 are moved apart, the springs 36 will automatically operate to urge the matrix segments 20 out of their seated positions with respect to the shell halves 11,12, as is shown in FIG. 3. When the matrix segments 20 are in this open position, a tire 47, which is to be cured, may be readily positioned within the matrix assembly. Then as the shell halves 11,12 are brought together, the matrix segments 20 will move together and towards the shell halves to the fully seated position of FIG. 3 at which time tread molding surfaces 48 thereof will come into pressurized contact with the tube portion which is to be molded and the desired tread will be molded within the tire in the manner shown in FIG. 3.

Once the tire has been properly treaded and cured, and the matrix assembly 10 is again opened, the matrix segments 20 will automatically move apart and separate themselves from the tire which has just been retreaded, generally as is shown in FIG. 2.

Although only a preferred embodiment of the invention has been specifically illustrated and described herein, it is to be understood that various minor modifications may be made in the matrix construction without departing from the spirit and scope of the invention, as defined by the appended claims.

I claim:

1. A matrix assembly for use in treading tires, said matrix assembly comprising cooperating axially separable matrix shell halves, a matrix half carried by each matrix shell half, said matrix assembly having an axis about which said matrix shell halves and said matrix halves are generally centered, each matrix half and its respective matrix shell half having first cooperating seating surfaces engageable in a plane extending generally transverse to said axis and second cooperating seating surfaces extending generally circumferentially around said axis and disposed at a converging angle to said axis, each matrix half being formed of a plurality of segments separately movable within and relative to the respective matrix shell half in a combined axial and circumferential direction from its seated position to a matrix expanding position for the release of a treaded tire and the reception of a tire to be treaded, a pair of guide pins carried by each matrix shell half mounting each respective matrix segment for guided retained movement between said seated position and said matrix expanding position, said matrix segments being formed of a relatively soft heat conducting metal, and wear retarding means for retarding wearing of said matrix segments during the movement of said matrix segments, said wear retarding means including said guide pins of each matrix segment being parallel and lying in a plane disposed at an angle to said axis generally equal to but slightly less than said angle of said second seating surfaces whereby as said matrix segments move to separate said first seating surfaces said matrix segment second seating surfaces move circumferentially inwardly away from the respective matrix shell half second seating surface and thereby prevent wearing of said second seating surfaces.

2. The matrix assembly of claim 1 wherein said wear retarding means also includes a hardened surface on each matrix segment defining said matrix segment second seating surface.

3. The matrix assembly of claim 2 wherein each guide pin is guidingly seated in a hardened guide sleeve insert carried by a respective matrix segment.

4. The matrix assembly of claim 1 wherein each guide pin is guidingly seated in a hardened guide sleeve insert carried by a respective matrix segment.

5. The matrix assembly of claim 4 wherein each guide pin has a stem portion and an enlarged head, said guide sleeve insert has a body portion defining a first guide surface and an apertured base defining a second guide surface, and said first guide surface engaging said guide pin head and said second guide surface engaging said guide pin stem.

6. The matrix assembly of claim 5 wherein each guide pin carries a compression spring engaging said base of the respective guide sleeve and constantly urging the respective matrix segment to an unseated position.

* * * * *